(12) United States Patent
Pavan

(10) Patent No.: US 6,168,817 B1
(45) Date of Patent: Jan. 2, 2001

(54) METHOD FOR THE CONTINUOUS PRODUCTION OF THREE-DIMENSIONAL SNACKS AND APPARATUS FOR PERFORMING THE METHOD

(75) Inventor: Mario Pavan, Galliera Veneta (IT)

(73) Assignee: Mafin S.p.A., Galliera Venta (IT)

(*) Notice: Under 35 U.S.C. 154(b), the term of this patent shall be extended for 0 days.

(21) Appl. No.: 09/202,841
(22) PCT Filed: Oct. 20, 1997
(86) PCT No.: PCT/EP97/05784
  § 371 Date: Dec. 14, 1998
  § 102(e) Date: Dec. 14, 1998
(87) PCT Pub. No.: WO98/47393
  PCT Pub. Date: Oct. 29, 1998

(30) Foreign Application Priority Data

Apr. 18, 1997 (IT) .............................................. PD97A0079

(51) Int. Cl.[7] .................................. A21C 5/00; A23P 1/00
(52) U.S. Cl. ...................... 426/503; 425/296; 425/305.1; 425/335; 425/363; 426/512
(58) Field of Search .................... 426/503, 502, 426/512, 518; 425/296, 305.1, 335, 363, 327

(56) References Cited

U.S. PATENT DOCUMENTS

| | | | |
|---|---|---|---|
| 5,196,223 | 3/1993 | Nakamura | 426/503 |
| 5,240,731 * | 8/1993 | Bornhorst et al. | 426/503 |
| 5,306,133 * | 4/1994 | Dayley | 426/503 |
| 5,614,237 | 3/1997 | Clow et al. | 426/502 |

FOREIGN PATENT DOCUMENTS

| | | |
|---|---|---|
| 2266489A | 11/1993 | (GB) . |
| TV94A0045 | 11/1995 | (IT) . |

* cited by examiner

Primary Examiner—George C. Yeung
(74) Attorney, Agent, or Firm—Guido Modiano; Albert Josif; Daniel O'Byrne

(57) ABSTRACT

A method for the continuous production of semifinished parts for three-dimensional snacks made from potatoes, cereals or the like, comprising, after preparing two layers of a gelled semifinished compound of the components and/or other starchy ingredients, the step of cutting the layers in consecutive segments along parallel lines with cutting edges which act with a relative motion constituted by a translatory motion which is substantially perpendicular to a portion to be cut, combined with a translatory motion which is parallel to the cutting lines. The method also includes a step in which the layers are superimposed and die-cut with suitable punches, separating a grid-like skeleton from the snacks, each snack being formed by two perimetrically joined layers.

20 Claims, 4 Drawing Sheets

METHOD FOR THE CONTINUOUS PRODUCTION OF THREE-DIMENSIONAL SNACKS AND APPARATUS FOR PERFORMING THE METHOD

BACKGROUND OF THE INVENTION

The present invention relates to a method for the continuous production of semifinished parts for three-dimensional snacks made from potatoes, cereals or the like and to an apparatus for performing the method.

Many snacks are currently widely commercially available; among these, particular importance is given to those obtained from cereals, tubers or similar foodstuffs obtained by frying in oil and available in sealed packages in food stores and the like, in public concerns such as bars, canteens, pubs, etcetera.

In recent times, in particular, three-dimensional snacks produced by perimetrically coupling two layers of a gelled semifinished compound, obtained by extruding moisturized mixtures of potatoes, cereals and/or other starchy products, are enjoying a high increase in sales.

A continuous processing line for the production of said snacks, disclosed in Italian patent application TV94A000045, filed May 5, 1994, in the name of Mario Pavan, is already known.

This continuous processing line prepares a semifinished compound of moisturized mixtures of cereals and/or other starchy ingredients, forms two gauged uniform layers, passes said layers through a layer cutting region in which each layer passes between a pair of rollers: one is a cutting roller provided with teeth and the second one is a contrast roller provided with corresponding hollows.

Passage between the rollers forms through cuts on the layers which allow the oil to flow, during frying, into the snack, providing uniform cooking.

The cutting roller and the contrast roller have an adjustable and variable speed; in any case, owing to the need to preserve the couplings between the teeth and the hollows, the mutual speeds must be identical.

In a subsequent region of the processing line, the layers are mutually superimposed and pass between an embossing roller and a complementary contrast roller.

The two layers are in fact die-cut so as to form shapes such as hearts, teddy bears, fish, hang-gliders and others and the formed snacks are separated from the skeleton.

Although it is an improvement with respect to previous lines and/or systems, the above-described processing line has been found to entail some drawbacks, particularly with reference to the quality of the finished product obtained therewith, caused in particular by the adhesive and sticky characteristics of the compound being processed.

A first drawback that has been observed is accordingly constituted by the fact that many of the cuts that are formed close again in the period between cutting and frying, and this is detrimental to the uniformity of the cooking of each snack as a whole.

Another drawback observed in particular during die-cutting is the mutual adhesion of the stacked layers.

Because of this, during cooking the snack does not swell uniformly, with rather poor aesthetic and qualitative results.

SUMMARY OF THE INVENTION

The aim of the present invention is to provide a method for the continuous production of semifinished parts for three-dimensional snacks made from potatoes, cereals or the like which allows to eliminate the above-described drawbacks of conventional production systems.

Within the scope of this aim, a consequent primary object of the present invention is to provide an apparatus for performing the method adequately.

Another important object of the present invention is to provide a method and a corresponding apparatus which allows to produce semifinished parts for snacks in which the cooking oil can penetrate between the layers in order to uniformly fry said snacks.

Another important object of the present invention is to provide a method and the corresponding apparatus which facilitates and enhances the three-dimensional shape of the snacks.

Another important object of the present invention is to provide a method and the corresponding apparatus which produce snacks which are better-tasting and crispier than those currently commercially available.

A further object of the present invention is to provide a method and the corresponding apparatus which allow to produce three-dimensional snacks with production costs that are competitive with respect to conventional ones.

This aim, these objects and others which will become apparent hereinafter are achieved by a method for the continuous production of semifinished parts for three-dimensional snacks made from potatoes, cereals or the like which comprises, after preparing two layers of a gelled semifinished compound of said components and/or other starchy ingredients, the steps of:

cutting the layers in consecutive segments along parallel lines with cutting edges which act on the layer material with a relative motion constituted by a translatory motion which is substantially perpendicular to a portion to be cut;

overlapping the cut layers and die-cutting them with suitable punches, separating a grid-like skeleton from the snacks, each snack being formed by two perimetrically joined layers.

Advantageously, the die-cutting and superimposition of the layers occur when said layers are at an advanced state of cooking, which enhances the elastic and plastic characteristics of the layers.

BRIEF DESCRIPTION OF THE DRAWINGS

Further characteristics and advantages of the present invention will become apparent from the following detailed description of the steps of the method and of an embodiment of the apparatus, illustrated only by way of non-limitative example in the accompanying drawings, wherein.

DESCRIPTION OF THE PREFERRED EMBODIMENTS

Figure 1:
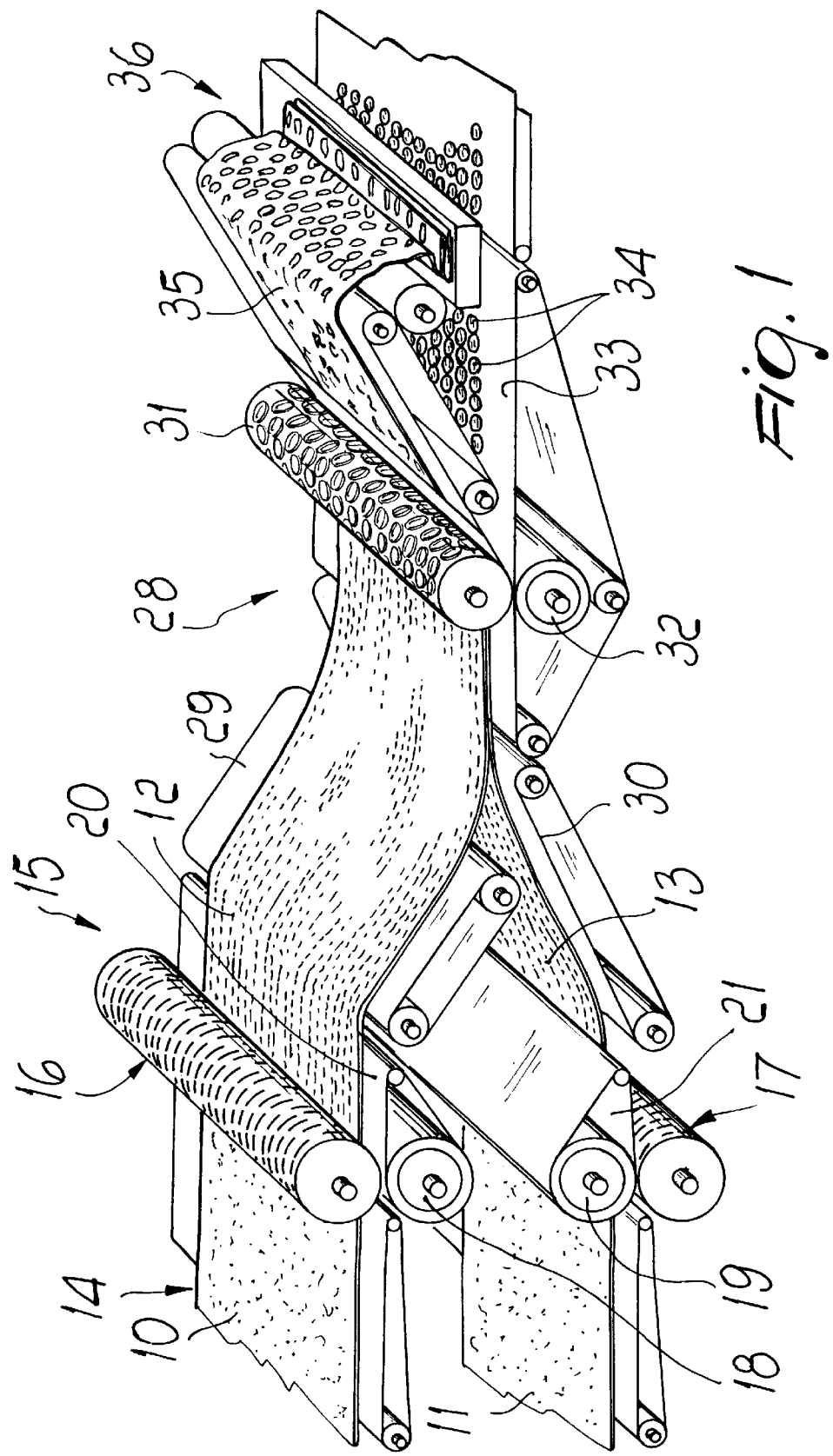
FIG. 1 is a schematic perspective view of the part of the apparatus according to the invention.
Figure 2:
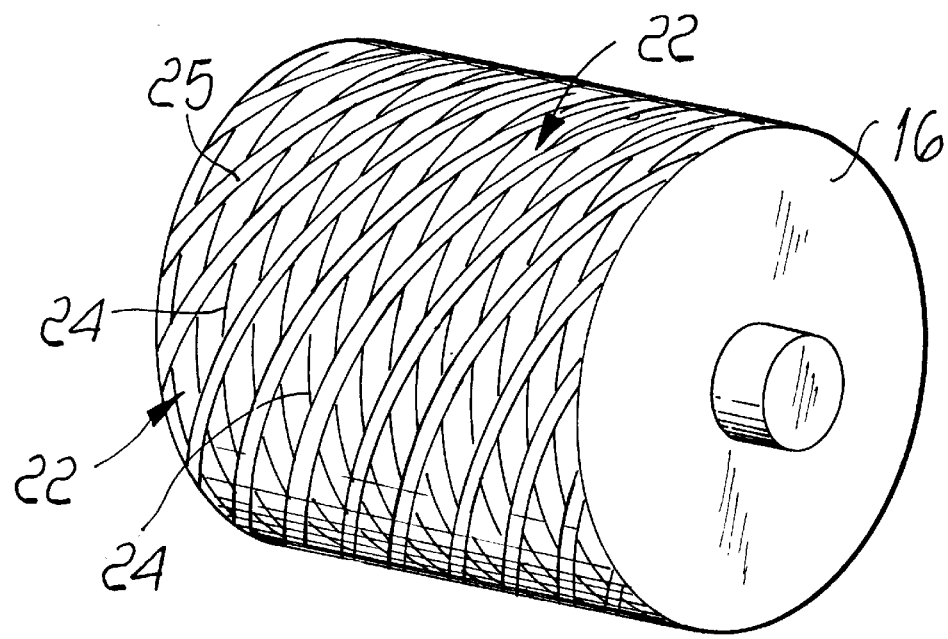
FIG. 2 is a perspective view of a cutting roller.
Figure 3:
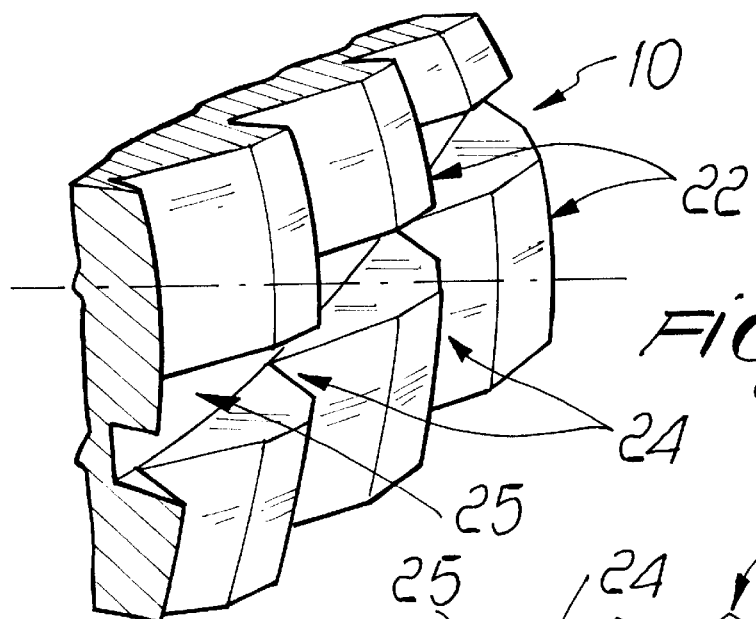
FIG. 3 is an enlarged-scale perspective view of a detail of the roller of FIG. 2.
Figure 4:
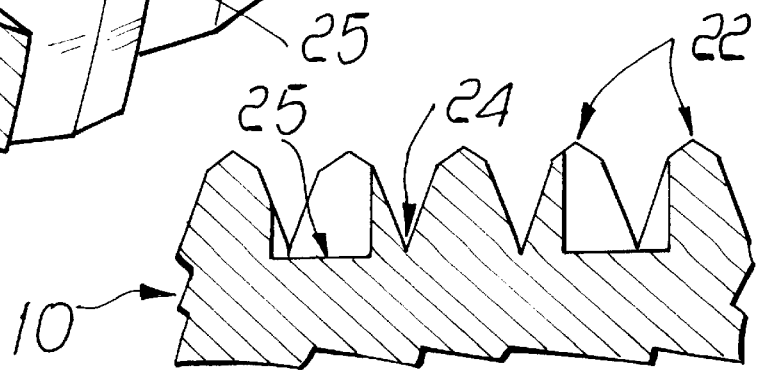
FIG. 4 is an enlarged-scale radial sectional detail view of the rolling band of the roller of FIG. 2.
Figure 5:
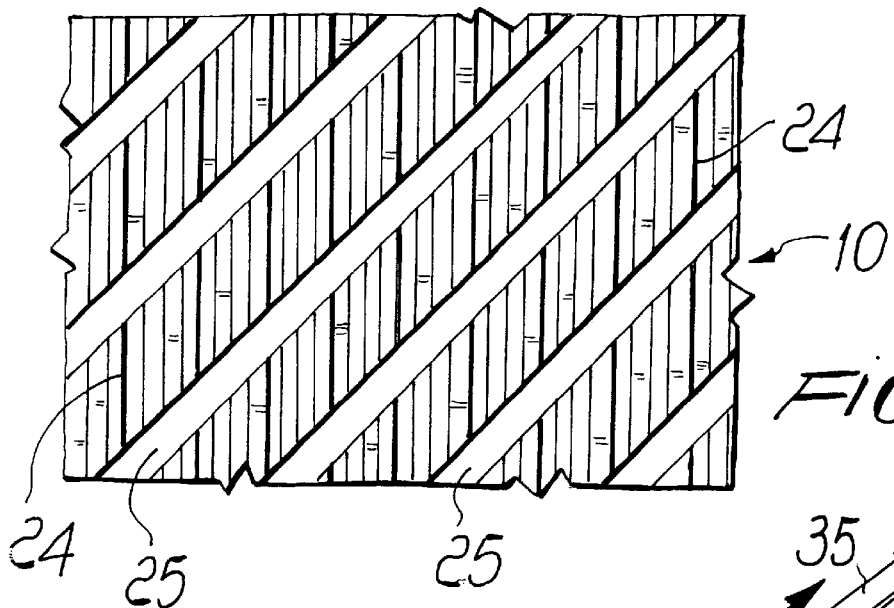
FIG. 5 is a front view of the rolling band of the roller of FIG. 2.
Figure 9:
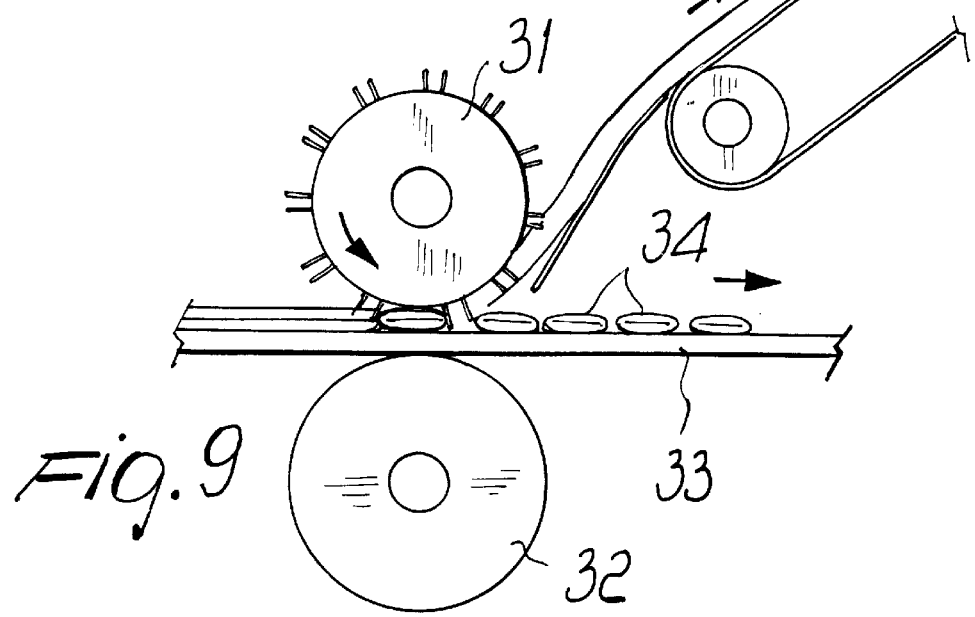
FIG. 9 is an enlarged-scale detail side view of the part of the apparatus related to the die-cutting of the product.
Figure 10:
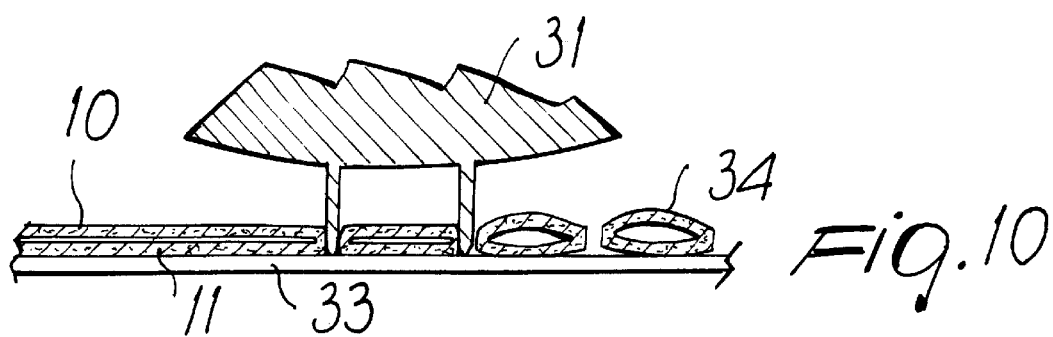
FIG 10. is an enlarged-scale view of a detail of FIG. 9.
Figure 6:
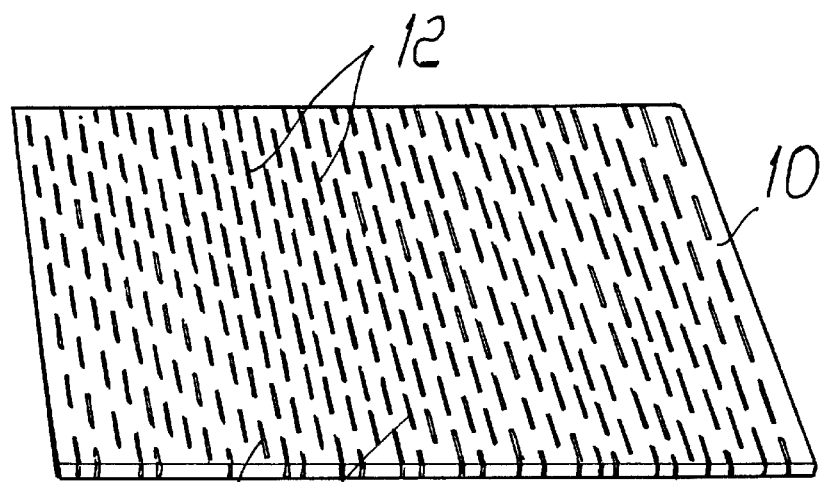
FIG. 6 is a view of a layer being processed after cutting.
Figure 7:
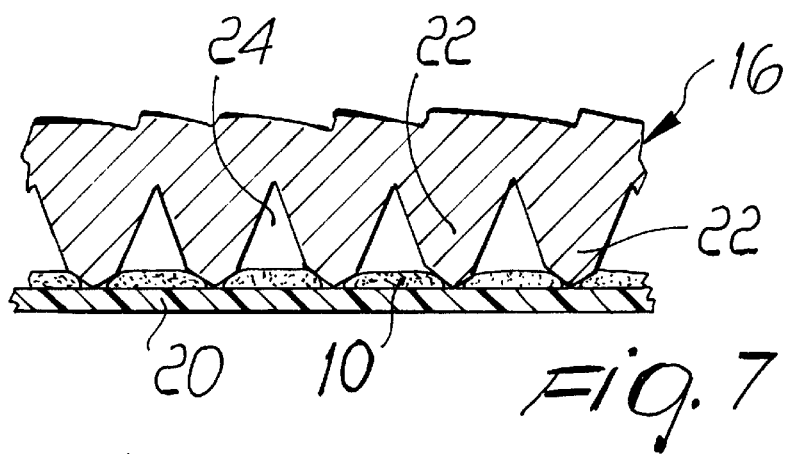
FIG. 7 is a sectional view of a detail of the action of the cutting roller on the layer.
Figure 8:
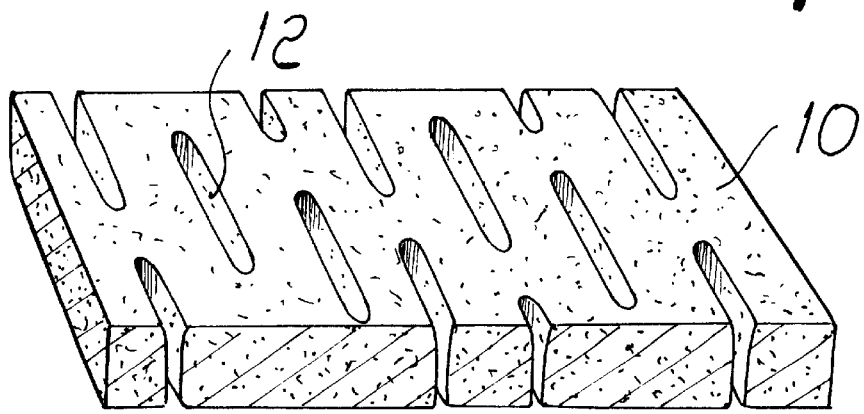
FIG. 8 is a perspective enlarged-scale view of a detail of the layer of FIG. 5.

With reference to the above figures, a method for the continuous production of three-dimensional snacks made from potatoes, cereals or the like according to the present invention comprises, after preparing two layers of a gelled semifinished compound of said components and/or other starchy ingredients, produced in a part of the apparatus which is not shown in the figures for the sake of simplicity and is per se known, a first step in which the upper and lower layers, designated by the reference numerals 10 and 11 respectively in FIG. 1, are cut in consecutive segments 12 and 13 along parallel lines by means of cutting edges which will be better described hereinafter and act on the material with a relative motion constituted by a translatory motion which is substantially perpendicular to the portion to be cut.

This step is performed with material in an advanced state of cooking, so that its elastic and plastic characteristics and its strength are enhanced.

The apparatus then has, downstream of a continuous feeding region 14, after the formation and gauging of the layers 10 and 11, not shown, a cutting region 15 which is composed, for each layer, of a cutting roller, respectively designated by the reference numerals 16 and 17, and by a smooth complementary contrast roller, respectively designated by the reference numerals 18 and 19, with a flexible rolling surface.

Each complementary contrast roller 18 and 19 constitutes one of the two guiding elements of a corresponding sliding contrast belt, designated by the reference numerals 20 and 21 respectively.

Each cutting roller 16 and 17 has teeth on its rolling surface; the figures show only the teeth of the first roller, which are designated by the reference numeral 22 and are obtained by combining circumferential and equidistant parallel hollows 24 with a plurality of helical hollows 25 which cross the first hollows.

The hollows 24 are composed of two portions having different angles, so that the aperture angle of the cutting edge of each tooth 22 is in any case wide enough to facilitate the movement and consequent upsetting of the material.

The teeth 22 act on the material by penetrating it substantially at right angles to the action produced by the rotation of the roller and by upsetting it at right angles with respect to the advancement direction of the layer.

A subsequent step of the method consists in superimposing the cut layers and in die-cutting them with suitable punches, separating a grid-like skeleton from the snacks, each whereof is formed by two perimetrically joined layers.

For this operation, the apparatus has a region 28 for overlapping and forming the snacks, toward which conveyor belts 29 and 30 guide the layers 10 and 11 so that they converge.

The region 28 comprises a die-cutting roller 31, on the rolling surface whereof the cutting punch is provided, and a complementary contrast roller 32 with a smooth rolling surface which is preferably flexible.

A conveyor belt 33 is interposed between the die-cutting roller 31 and the complementary contrast roller 32; by receiving the two overlapping layers 10 and 11, the belt 33 conveys them to die-cutting and then conveys the formed semifinished snacks 34.

The semifinished snacks 34 are separated from the grid-like skeleton 35, which is conveyed by a conveyor belt 36 arranged in an upward region to a conventional section 36 for recovering and reusing the material.

At this point it should be noted that the high degree of gelling of the material before die-cutting, its elastic and plastic characteristics, and the conveyance speed of the belts cause, as mentioned, said material to be tensioned longitudinally in the region upstream of the formation of the snacks, so that die-cutting produces, by dividing the semifinished snacks 34 from the skeleton 35, a detensioning of the semifinished snacks 34 which, by retracting longitudinally, spontaneously produce a certain swelling, so that apart from the perimetric regions the two layers are mutually separated.

Accordingly, the formed semifinished parts 34 first of all have neatly formed cuts, which produce optimum penetration of oil during frying, and also have a complete separation between the walls that compose them, so that they already have a three-dimensional configuration before frying.

At the end of the apparatus, the semifinished snacks are dried until they reach a condition in which they can be stably preserved and are in equilibrium, and are then expanded, as mentioned, by frying or in an air oven so as to be ready for consumption.

In practice it has been observed that the intended aim and objects of the present invention have been achieved.

The drawbacks observed in the systems and processes used so far, i.e., closure of the slits and of the passage of the oil and adhesion of the inside walls of said snacks, have in fact been eliminated.

The invention thus conceived is susceptible of numerous modifications and variations, all of which are within the scope of the same inventive concept.

All the details may furthermore be replaced with other technically equivalent elements.

In practice, the materials employed, so long as they are compatible with the contingent use, as well as the dimensions, may be any according to requirements.

What is claimed is:

1. A method for the continuous production of three-dimensional snacks which comprises, after preparing two layers of a gelled semifinished compound material, the steps of:

cutting the layers in consecutive segments along parallel lines with cutting edges which act on the material of the layer with a relative motion constituted by a translatory motion which is substantially perpendicular to a portion to be cut;

overlapping the cut layers and die-cutting them with punches, separating a grid-like skeleton from the snacks, each snack being formed by two perimetrically joined layers;

said cutting step being performed by means of cutting rollers provided with teeth which act on the layer material penetrating it substantially at right angles and upsetting it at right angles with respect to the advancement direction of the layer, said cutting rollers defining through cuts.

2. The method according to claim 1, wherein said cutting and die-cutting steps are performed with said layers having a high degree of gelling.

3. The method according to claim 1, wherein said cutting and die-cutting steps are performed with said layers subjected to an elastic tension that tends to elongate them, said elastic tension being the result of passing said layer of material, with the cuts already defined, on conveyor belts which provide tension to the layers, in addition to detaching said layers from the cutting rollers.

4. An apparatus for performing a method for continuous production of three-dimensional snacks, comprising, downstream of a region for continuously feeding layers of gelled semifinished material, a cutting region which is composed, for each layer, of a cutting roller with cutting edges on its rolling surface and of a smooth complementary contrast roller on which a sliding contrast belt is guided, said cutting region being followed by a region for overlapping the layers and for forming the snacks, which comprises a die-cutting roller and a further complementary contrast roller, said cutting edges being formed by teeth adapted to define through cuts into each of said layers, conveyor belts being arranged downstream of said sliding contrast belts and cutting rollers, to give tension to said gelled semifinished material, before said layers of gelled semifinished material pass to the region for forming the snacks.

5. The apparatus according to claim 4, wherein said complementary contrast roller has a flexible rolling surface.

6. The apparatus according to claim 4, wherein each one of said complementary contrast rollers constitutes one of two guiding elements of said corresponding sliding contrast belt.

7. The apparatus according to claim 4, wherein said teeth are provided on the rolling surface of said cutting roller.

8. The apparatus according to claim 7, characterized in that said teeth are obtained by combining parallel and equidistant circumferential hollows with a plurality of further hollows which have a helical arrangement and intersect the circumferential hollows.

9. The apparatus according to claim 8, wherein said circumferential and further hollows form a tooth with a cutting cusp having an angle.

10. The apparatus according to claim 4, wherein the rolling surface of said further complementary contrast roller of said die-cutting roller is smooth.

11. The apparatus according to claim 10, wherein said smooth surface is flexible.

12. The apparatus according to claim 4, wherein a conveyor belt is interposed between said die-cutting roller and said complementary contrast roller, receives the two superimposed layers, conveys them to die-cutting and then conveys the formed snacks downstream.

13. An apparatus for performing a method for continuous production of three-dimensional snacks, comprising, downstream of a region for continuously feeding layers of gelled semifinished material, a cutting region which is composed, for each layer, of a cutting roller with cutting edges on its rolling surface and of a smooth complementary contrast roller on which a sliding contrast belt is guided, said cutting region being followed by a region for overlapping the layers and for forming the snacks, which comprises a die-cutting roller and a further complementary contrast roller, said cutting edges being formed by teeth adapted to define through cuts into each of said layers, wherein said teeth are obtained by combining parallel and equidistant circumferential hollows with a plurality of further hollows which have a helical arrangement and intersect the circumferential hollows.

14. The apparatus according to claim 13, wherein said complementary contrast roller has a flexible rolling surface.

15. The apparatus according to claim 13, wherein each one of said complementary contrast rollers constitutes one of two guiding elements of said corresponding sliding contrast belt.

16. The apparatus according to claim 13, wherein said teeth are provided on the rolling surface of said cutting roller.

17. The apparatus according to claim 13, wherein said circumferential and further hollows form a tooth with a cutting cusp having an angle.

18. The apparatus according to claim 13, wherein the rolling surface of said further complementary contrast roller of said die-cutting roller is smooth.

19. The apparatus according to claim 18, wherein said smooth surface is flexible.

20. The apparatus according to claim 13, wherein a conveyor belt is interposed between said die-cutting roller and said complementary contrast roller, receives the two superimposed layers, conveys them to die-cutting and then conveys the formed snacks downstream.

\* \* \* \* \*